(12) United States Patent
Hadley (10) Patent No.: US 9,418,026 B2
(45) Date of Patent: Aug. 16, 2016

(54) TRANSITION BETWEEN STATES IN A PROCESSOR

(75) Inventor: Ted A Hadley, Sunnyvale, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 14 days.

(21) Appl. No.: 14/130,871

(22) PCT Filed: Feb. 8, 2012

(86) PCT No.: PCT/US2012/024367
§ 371 (c)(1),
(2), (4) Date: Jan. 3, 2014

(87) PCT Pub. No.: WO2013/012449
PCT Pub. Date: Jan. 24, 2013

(65) Prior Publication Data
US 2014/0130189 A1 May 8, 2014

Related U.S. Application Data

(60) Provisional application No. 61/509,078, filed on Jul. 18, 2011.

(51) Int. Cl.
*G06F 13/16* (2006.01)
*H04L 9/32* (2006.01)
(Continued)

(52) U.S. Cl.
CPC .............. *G06F 13/1642* (2013.01); *G06F 1/24* (2013.01); *G06F 11/2284* (2013.01); *G06F 12/1433* (2013.01); *G06F 12/1483* (2013.01); *G06F 13/1663* (2013.01); *G06F 21/54* (2013.01); *G06F 21/55* (2013.01); *G06F 21/57* (2013.01); *G06F 21/575* (2013.01); *G06F 21/602* (2013.01); *G06F 21/72* (2013.01);
(Continued)

(58) Field of Classification Search
CPC .................................. G06F 21/54; H04L 9/32
See application file for complete search history.

(56) References Cited

U.S. PATENT DOCUMENTS 6,466,048 B1 10/2002 Goodman
7,185,249 B2 * 2/2007 Tkacik et al. ................. 714/726
(Continued)

FOREIGN PATENT DOCUMENTS

CN 1650183 A 8/2005

OTHER PUBLICATIONS

International Searching Authority, Appl. No. PCT/US2012/024367, filed Feb. 8, 2012, Search Report and Written Opinion, 10pp, dated Jul. 16, 2012.
(Continued)

*Primary Examiner* — Beemnet Dada
(74) *Attorney, Agent, or Firm* — Hewlett Packard Enterprise Patent Department (57) ABSTRACT

In one implementation, a processor is provided that includes logic to enable a transition from a zeroize state to a clear state. In another implementation, a processor is provided that includes logic to enable a testing secure state, the testing state to enable a testing function; logic to enable a clear state, the clear state to enable a non-secure processing function and to disable a security function; logic to enable a transition from a testing secure state to a clear state; and logic to enable a full secure state, the full secure state to enable the processing function. In another implementation, a processor is provided that includes logic to disable a transition from a clear state to a secure state.

15 Claims, 5 Drawing Sheets

(51) Int. Cl.
*G06F 21/54* (2013.01)
*G06F 21/75* (2013.01)
*H04L 9/08* (2006.01)
*G06F 1/24* (2006.01)
*G06F 21/57* (2013.01)
*G06F 12/14* (2006.01)
*G06F 21/60* (2013.01)
*G06F 21/55* (2013.01)
*G06F 21/72* (2013.01)
*G06F 21/79* (2013.01)
*G06F 21/78* (2013.01)
*G09C 1/00* (2006.01)
*G06F 11/22* (2006.01)
*G06F 21/74* (2013.01)
*G01R 31/317* (2006.01)

(52) U.S. Cl.
CPC ............... *G06F 21/74* (2013.01); *G06F 21/75* (2013.01); *G06F 21/78* (2013.01); *G06F 21/79* (2013.01); *G09C 1/00* (2013.01); *H04L 9/088* (2013.01); *H04L 9/0816* (2013.01); *H04L 9/32* (2013.01); *G01R 31/31719* (2013.01); *G06F 2221/2143* (2013.01); *H04L 2209/12* (2013.01)

(56) References Cited

U.S. PATENT DOCUMENTS

| | | | |
|---|---|---|---|
| 7,265,611 B2* | 9/2007 | Wang | 330/9 |
| 7,398,441 B1 | 7/2008 | Gee | |
| 7,457,960 B2 | 11/2008 | Kablotsky | |
| 7,844,835 B2 | 11/2010 | Ginter et al. | |
| 7,954,153 B2 | 5/2011 | Bancel et al. | |
| 8,819,839 B2* | 8/2014 | Henry et al. | 726/26 |
| 2003/0140228 A1 | 7/2003 | Binder | |
| 2003/0200453 A1 | 10/2003 | Foster et al. | |
| 2003/0200454 A1 | 10/2003 | Foster et al. | |
| 2004/0088333 A1 | 5/2004 | Sidman | |
| 2004/0210764 A1 | 10/2004 | McGrath et al. | |
| 2006/0031685 A1 | 2/2006 | Chen et al. | |
| 2006/0059373 A1 | 3/2006 | Fayad et al. | |
| 2007/0136606 A1 | 6/2007 | Mizuno | |
| 2007/0237325 A1 | 10/2007 | Gershowitz et al. | |
| 2008/0010567 A1 | 1/2008 | Hughes et al. | |
| 2008/0112405 A1 | 5/2008 | Cholas et al. | |
| 2009/0055637 A1 | 2/2009 | Holm et al. | |
| 2009/0290712 A1 | 11/2009 | Henry et al. | |
| 2009/0293130 A1 | 11/2009 | Henry et al. | |
| 2010/0057960 A1 | 3/2010 | Renno | |
| 2012/0224691 A1 | 9/2012 | Purohit | |
| 2013/0305380 A1 | 11/2013 | Diehl | |
| 2014/0358949 A1 | 12/2014 | Hu | |

OTHER PUBLICATIONS

Supplementary Partial European Search Report, European Patent Application No. 12814434.2, Jan. 28, 2016, 10 pages.

* cited by examiner

TRANSITION BETWEEN STATES IN A PROCESSOR

CROSS-REFERENCE TO RELATED APPLICATIONS

This application claims priority to U.S. provisional patent application No. 61/509,078, filed on Jul. 18, 2011, which is hereby incorporated by reference herein in its entirety.

BACKGROUND

Integrated circuits are utilized in many electronic devices and systems. Designing, testing and manufacturing integrated circuits typically follow a design flow. An integrated circuit may enable one of a plurality of modes, depending on the stage of the design flow. A state machine may be used to illustrate the behavior, or state, of the integrated circuit.

DETAILED DESCRIPTION

Common processors, for example, microprocessors, provide no security for code or data stored external to the microprocessor chip. Secure microprocessors provide for encryption of all data on external busses. A Federal Information Processing Standards (FIPS) 140 series are US government computer security standards that specify requirements for cryptography modules.

In a secure microprocessor, upon a failure, or breach, of the microprocessor when in a secure state, secure data may be erased and the microprocessor zeroized. Due to potential memory imprinting, the microprocessor may be discarded and not recycled for reuse.

However, where a secure microprocessor utilizes a non-imprinting process to avoid imprinting of secure data in memory, it is not necessary to discard the microprocessor upon a failure or a breach.

As discussed herein, an apparatus having a processor is provided. The processor may include a state machine to control the state of the processor. The processor may include logic to enable a zeroize state, the zeroize state being a security disabled fault state; logic to enable a clear state, the clear state to enable a non-secure processing function and to disable a security function; and logic to enable a transition from the zeroize state to the clear state. By providing the ability to transition from the zeroize state to the clear state, the processor may be recycled and reused.

As further discussed herein, within a secure state, a testing secure state and a full secure state may be implemented. By providing for a testing secure state and a full secure state, the same processor may be tested and then transitioned into a full secure state, thereby ensuring the quality of the processor. In addition, it allows for full operation of the secure processing in a testing state thereby enabling development of secure boot code and development of decryption and signature validation operations. For example, the processor may include logic to enable a testing secure state, the testing state to enable a testing function; logic to enable a clear state, the clear state to enable a non-secure processing function and to disable a security function; logic to enable a transition from a clear state to the testing secure state; logic to enable a transition from a testing secure state to a clear state; logic to enable a full secure state, the full secure state to enable the processing function; and logic to enable a transition from clear state to full secure state.

As further described herein, a configuration, for example, an integrated fuse controlled configuration, may be utilized which disallows, or allows, the security features from being made accessible to the user. This allows the manufacturer to build one chip and sell it in many ways for different prices. For example, a processor may include logic to enable a secure state, the state to enable a secure processing function; logic to enable a clear state, the clear state to enable a non-secure processing function; and logic to disable a transition from a clear state to a secure state.

Figure 1:
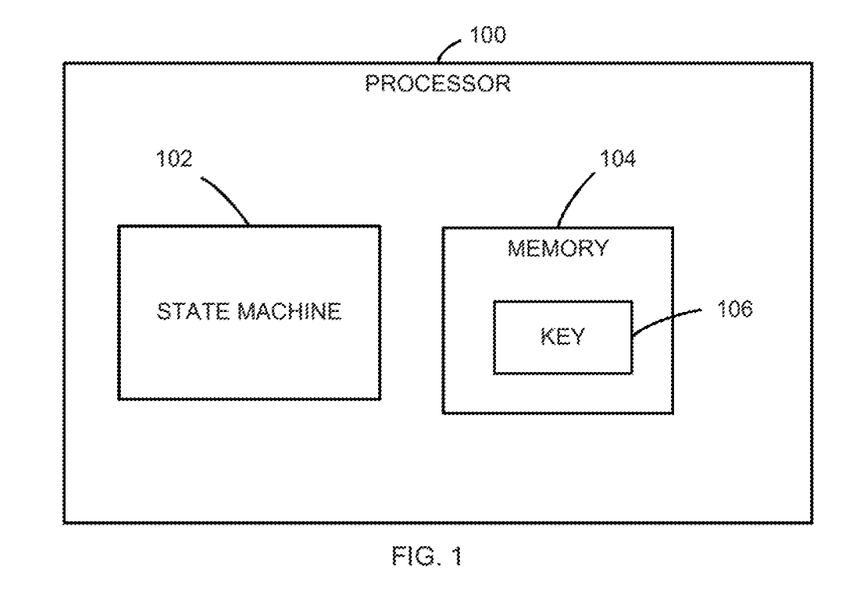
FIG. 1 is an example schematic block diagram of a processor, according to one or more implementations.

FIG. 1 is a schematic block diagram of a processor including a state machine and memory, according to one or more implementations. Processor 100 may include, state machine 102, memory 104, and key 106. Processor 100 is any of a variety of processors. For example, processor 100 may be a general-purpose processor or an application-specific processor implemented as a hardware module and/or a software module hosted at a hardware module. A hardware module may be, for example, a microprocessor, a microcontroller, an application-specific integrated circuit ("ASIC"), a programmable logic device ("PLD") such as a field programmable gate array ("FPGA"), and/or other electronic circuits that perform operations. A software module may be, for example, instructions, commands, and/or codes stored at a memory and executed at another processor. Such a software module may be defined using one or more programming languages such as Java™, C++, C, an assembly language, a hardware description language, and/or another suitable programming language.

In some implementations, processor 100 may include multiple processors. For example, processor 100 may be a microprocessor including multiple processing engines (e.g., computation, algorithmic or thread cores). As another example, processor 100 may be at a computing device including multiple processors with a shared clock, memory bus, input/output bus, and/or other shared resources. Furthermore, processor 100 may be a distributed processor. For example, processor 100 may include multiple computing devices, each including a processor, in communication one with another via a communications link such as a computer network.

State machine 102 may be implemented as a finite state machine implemented in hardware and may enable functionality in processor 100 in accordance with one or more plurality of states. The state machine may be non-volatile, such that the security is maintained with a power-off cycle. The state machine may enable the processor to operate in one of a clear state, with all security features disabled; in secure state, with security features active; and in zeroized state, which is the security disabled fault state. This process allows for easy development of secure software by allowing the state to revert to clear state from secure state under certain circumstances, and allows for failed units to be repaired and redeployed by allowing the state to move from zeroize state to clear state under certain circumstances. Software development, testing, manufacturing, and initialization are simple. The resulting structure may be validated by security standards bodies and be FIPS-140 compliant.

Memory 104 may store key 106. Key 106 may be implemented as, for example, a secure key. While only one key is depicted, memory 104 may store multiple keys. Processor 100 may provide functionality to secure key 106, for example, non-imprinting of key 106 in memory 104, zeroization, for example, fast zeroization, secure access to prevent unintended reads and writes, etc. In an implementation, memory 104 is a non-volatile (or non-transient) memory. Memory may be controlled by a memory control module (not shown) that facilitates management of the key stored in memory. Memory control module may be located on the processor 100. Memory control module may include circuitry, software hosted at that circuitry, or a combination thereof to write and erase keys stored in memory.

Key 106 is a data set such as a cryptographic key that is accessed by processor 100 for use within one or more of applications such as a cryptographic service hosted at a computing device. In other words, processor 100 requests key 106 at memory control module 240, uses key 106 to perform a cryptographic process based on instructions or codes stored at memory 230.

Figure 2:
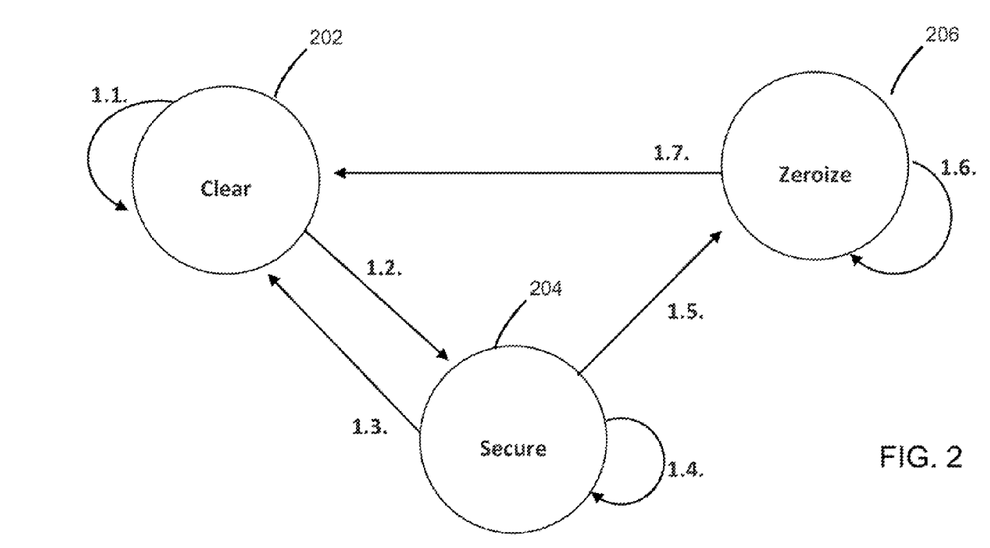
FIG. 2 is an example state machine, according to an implementation.

FIG. 2 depicts an example of a state machine according to an implementation. As shown in FIG. 2, a state machine is depicted having three states, a clear state 202, a secure state, 204 and a zeroize state 206.

The state machine may enable the processor to operate in one of a clear state 202, a default state with all security features disabled; in secure state 204, with security features active; and in zeroized state 206, which is the security disabled fault state.

The clear state 202 allows the processor to operate as a regular, non-secure processor. A key may be loaded into memory while the processor is in clear state.

Logic may be provided that enables the regular processor to transition to the secure state 204 from the clear state 202 where security features are made accessible for processing functionality. This logic may be implemented as, for example, a fuse, antifuse, physically unclonable function (PUF), or other similar technology, to enable or disable the transition for a limited number of times.

The secure state 204 allows the processor to operate in a secure state. A key may be loaded into memory while the processor is in secure state.

Zeroize state 206 is a state where a key in memory is zeroized due to, for example, a security violation, a fatal fault, etc.

Zeroization may be a fast writing process which, for example, first writes all "1"s over the key in memory, then overwrites the memory with all "0"s. Alternatively, other overwriting processes may be utilized such that the key is erased in memory.

The following represents the initial state, the final state, and the cause of each of the transitions noted in FIG. 2. These transitions, together with the other transitions discussed herein, may be controlled by hardware, software or a combination of hardware or software.

| Transition Number | Initial State | Final State | Cause |
|---|---|---|---|
| 1.1. | Clear | Clear | Boot/reboot in Clear state. This is default operation of the processor. |
| 1.2. | Clear | Secure | Factory initialization. |
| 1.3. | Secure | Clear | Engineering and possibly Manufacturing rework. This transition zeroizes the key in memory. |
| 1.4. | Secure | Secure | This is rebooting when deployed to a customer in Secure state. |
| 1.5. | Secure | Zeroize | This is a fault transition when, for example, a security violation has occurred. This transition enables the Key in memory be zeroized. |
| 1.6. | Zeroize | Zeroize | This is rebooting when in Zeroize state. This will occur at a customer site, Tech Support, Manufacturing, Engineering, etc. This transition enables the key in memory be zeroized. |
| 1.7. | Zeroize | Clear | This is in Manufacturing when reworking/repairing a returned unit. This transition enables the key in memory be zeroized. This is all power removed. |

Transition 1.1., 1.3., 1.5., 1.6., and 1.7. may include erasing of the key in memory.

Figure 3:
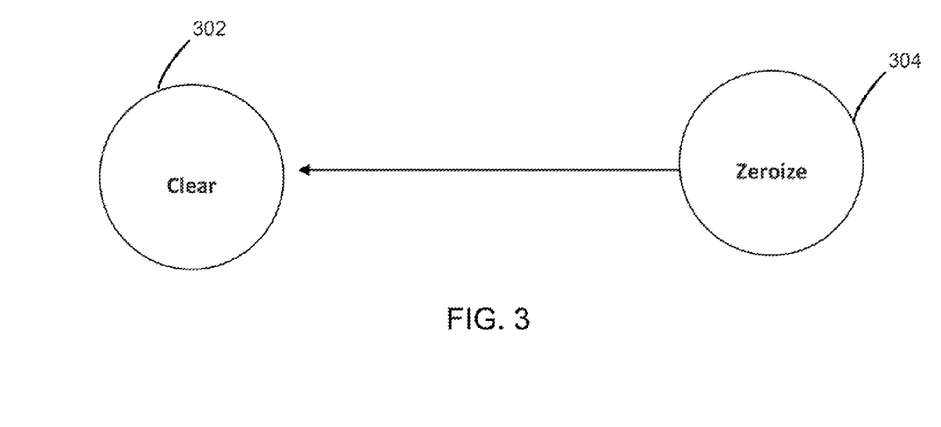
FIG. 3 is an example clear state and zeroize state, according to an implementation.

FIG. 3 is an example clear state and zeroize state, according to an implementation. As shown in FIG. 3, clear state 302 and zeroize state 304 are depicted with a transition between them. After a processor has been zeroized, instead of requiring disposal of the processor, a transition from the zeroized state to the clear state is provided wherein the processor can be reworked and/or repaired such that the processor may be used again. This transition may be enabled as the key stored in memory may be subject to memory non-imprinting processes to avoid imprinting of the key in memory.

Figure 4:
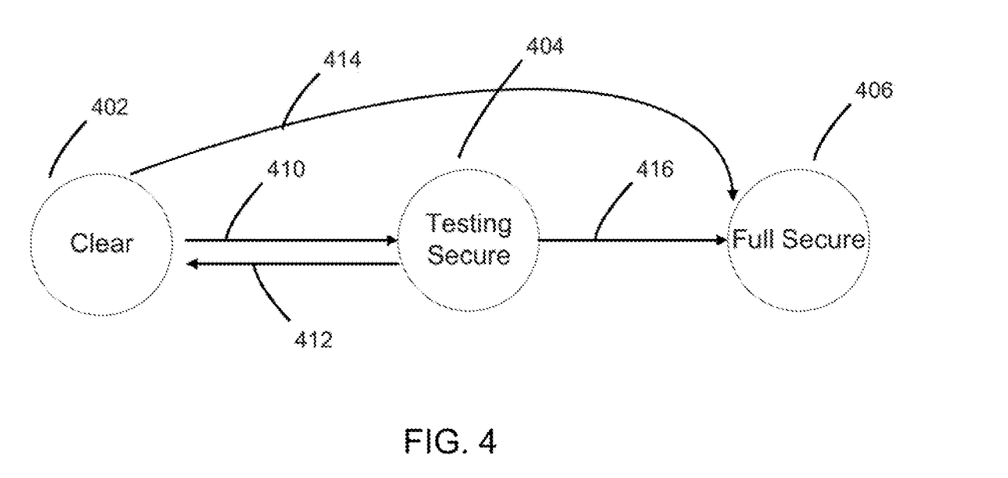
FIG. 4 is an example clear state, testing secure state and full secure state, according to an implementation.

A secure state may be implemented by a testing secure state and full secure state. For example, FIG. 4 depicts an example clear state 402, testing secure state 404 and full secure state 406. Testing secure state 404 may be a state that enables testing of functionality of the processor with one or more security features enabled. Testing secure state 404 may be enabled via transition 410 from clear state 402. Upon a reset or a power-off, transition 412 to the clear state 402 is enabled. Testing secure state 404 may transition via 416 to full secure state 406.

Full secure state 406 may be state that enables functionality of the processing with one or more security features enabled. Full secure state 406 may be enabled via transition 414 from clear state 402. Full secure state 406 may not transition to clear state 402. By not providing for a transition from full secure state 406 to clear state 402, key stored in memory may be kept secure.

Figure 5:
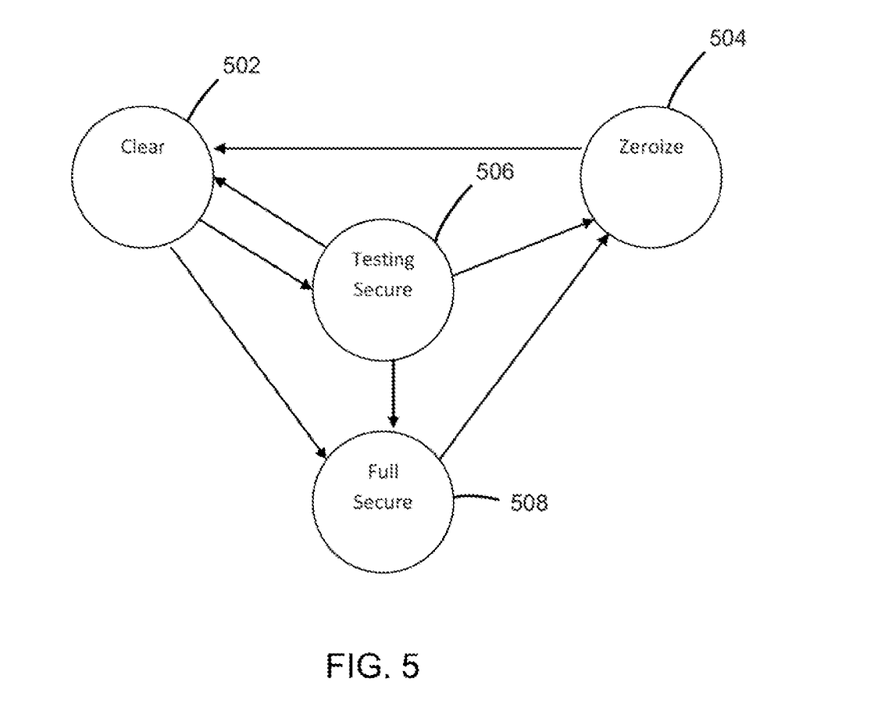
FIG. 5 is an example clear state, testing secure state, full secure state, and zeroize state, according to an implementation.

FIG. 5 depicts an example state machine including clear state 502, zeroize state 504, testing secure state 506 and full secure state 508. Clear state 502, testing secure state 506 and full secure state 508 operate as discussed with respect to FIG. 4. As can be seen in FIG. 5, testing secure state 506 may transition to clear state 502, full secure state 508, or zeroize state 504. Zeroize state 504 may be enabled by transitioning from testing secure state 506 or full secure state 508. Zeroize state 504 may transition to clear state 502. However, full secure state 506 may not transition to clear state 502.

Figure 6:
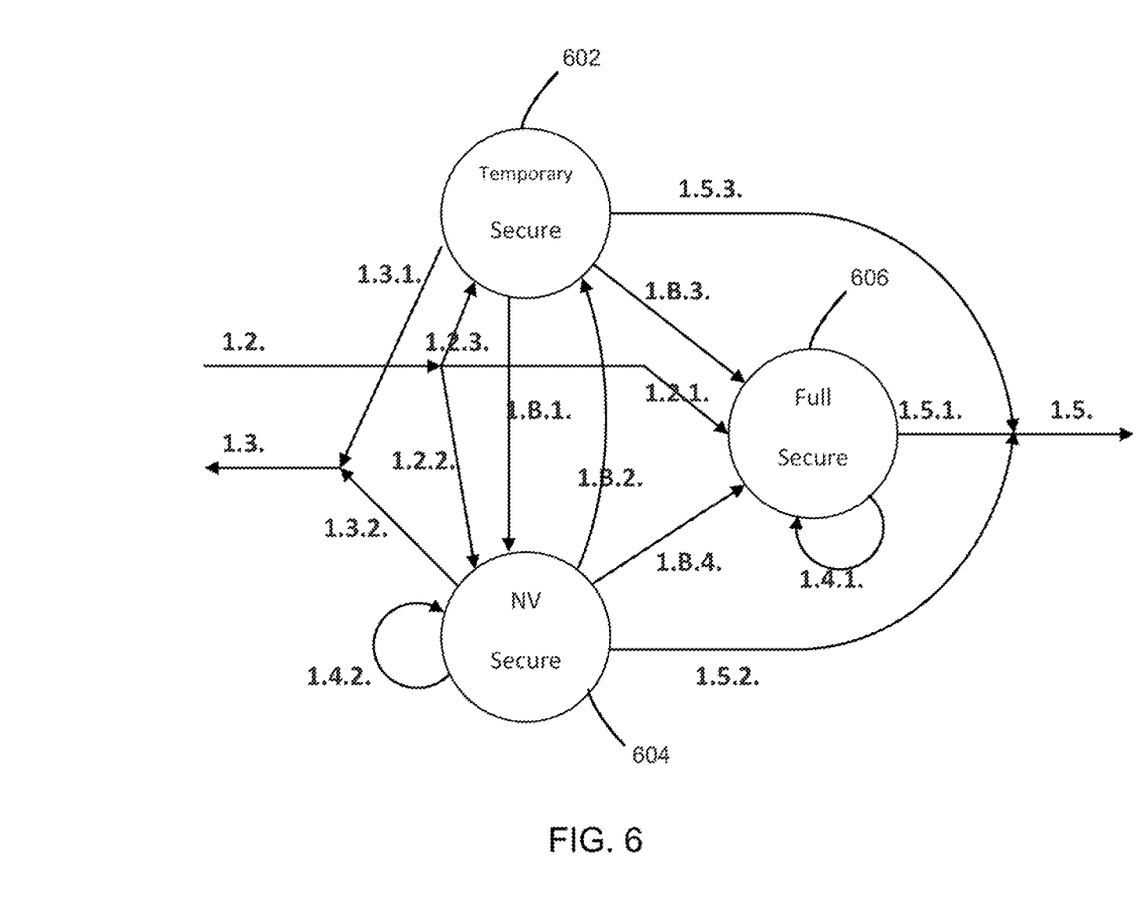
FIG. 6 is an example temporary secure state, non-volatile secure state and full secure state, according to an implementation.

Testing secure state may be implemented by a temporary secure state and a nonvolatile secure state. FIG. 6 is an example temporary secure state 602, non-volatile secure state 604 and full secure state 606, according to an implementation.

The following is a description of the temporary secure state 602, non-volatile secure state 604 and full secure state 606.

| State | Description |
|---|---|
| 1.B.a.: Temporary Secure State | In this state, the processor is placed in Secure state, but the Secure state is cleared and reset to Clear (default) state whenever there is a reset or complete power loss (including backup power). This state may be used only in engineering and manufacturing (development only). |
| 1.B.b.: Nonvolatile (NV) Secure State | In this state, the processor is placed in Secure state, but the Secure state is cleared and reset to Clear (default) state only when a total power loss occurs (including backup power). This state may be used in engineering and manufacturing (for example, initialization of product to Secure state). |
| 1.B.c.: Full Secure State | In this state, the processor is placed in Secure state semi-permanently. The only exit from this state is to Zeroize State. This may be the standard customer configuration for product. |

The following represents the initial state, the final state, and the cause of each of the transitions noted in FIG. 6. The transitions may be controlled by hardware, software or a combination of hardware or software.

| Transition Number | Initial State | Final State | Cause |
|---|---|---|---|
| 1.2.1. | Clear | Full Secure | This is the process of placing the device into Full Secure state starting from Clear state. |
| 1.2.2. | Clear | NV Secure | This is the process of placing the device into non-volatile Secure state. This transition may be used in the normal startup operation in the factory. This is also the standard operation in final engineering test and software quality assurance. |
| 1.2.3. | Clear | Temp. Secure | This is the process of placing the device in Temporary Secure state. This may be the standard operation for software development. |
| 1.3.1. | Temp. Secure | Clear | Reset or total power loss. |
| 1.3.2. | NV Secure | Clear | Total power loss. |
| 1.B.1. | Temp. Secure | NV Secure | Configuration change during operation; only in engineering. |
| 1.B.2. | NV Secure | Temp. Secure | Configuration change during operation; only in engineering. |
| 1.B.3. | Temp. Secure | Full Secure | Configuration change to full secure |
| 1.B.4. | NV Secure | Full Secure | Configuration change to full secure |
| 1.4.1. | Full Secure | Full Secure | Reboot (by reset) when in full secure state. This may occur at customer sites. |
| 1.4.2. | NV Secure | NV Secure | Reboot (by reset) when in non-volatile secure state. This may happen in manufacturing as part of unit configuration. |
| 1.5.1. | Full Secure | Zeroize | Security fault occurred while in full secure state. |
| 1.5.2. | NV Secure | Zeroize | Security fault occurred while in non-volatile secure state. |
| 1.5.3. | Temp. Secure | Zeroize | Security fault occurred while in temporary secure state. |

All transitions which leave one of the temporary secure state 602, non-volatile secure state 604 and full secure state 606 may pass through a zeroization state where the key in memory is erased.

Temporary secure state may not have a loop-to-self transition, for example, 1.4.1. and 1.4.2., because any event which would cause a reboot would also reset this state to clear (default state).

The only states valid in customer installations are clear (i.e., not a security module), full secure (i.e., security module in normal operation), and zeroize (i.e., a security module following a security fault).

Temporary secure state 602 and non-volatile secure state 604 allow for ease in development, testing, and manufacturing.

For example, during the code development phase, the temporary secure state 602 may be used to allow easy resetting of the processor to clear state for further testing and development.

In addition, secure code, including secure boot code, may be developed. Any reset allows for a quick return to the clear state.

During finalization of the code development, non-volatile secure may be used to, for example, fully test secure boot code since more effort than a simple reset is needed to revert to the default clear state.

In manufacturing, a product utilizing this state machine model may boot initially in clear state. A final test program may test and diagnose the final hardware.

The final test program (or another initialization program) may load the system keys and other data into secure key memory, and advance the state to non-volatile secure state. A reset may cause the secure product application to boot. If it is decrypted correctly and runs, it will examine the state machine and, seeing the state is non-volatile secure state, may advance the state to full secure. This is the product deliverable state. Thus, when in the full secure state, the processor was likely tested, initialized, loaded, and retested in secure state. If a failure occurs anytime before the secure product application runs, since the state machine is still in non-volatile secure state, all that is needed is full removal of power to cause all state information to be lost. When restarted, it will be in clear state, and able to reinitialize.

Figure 7:
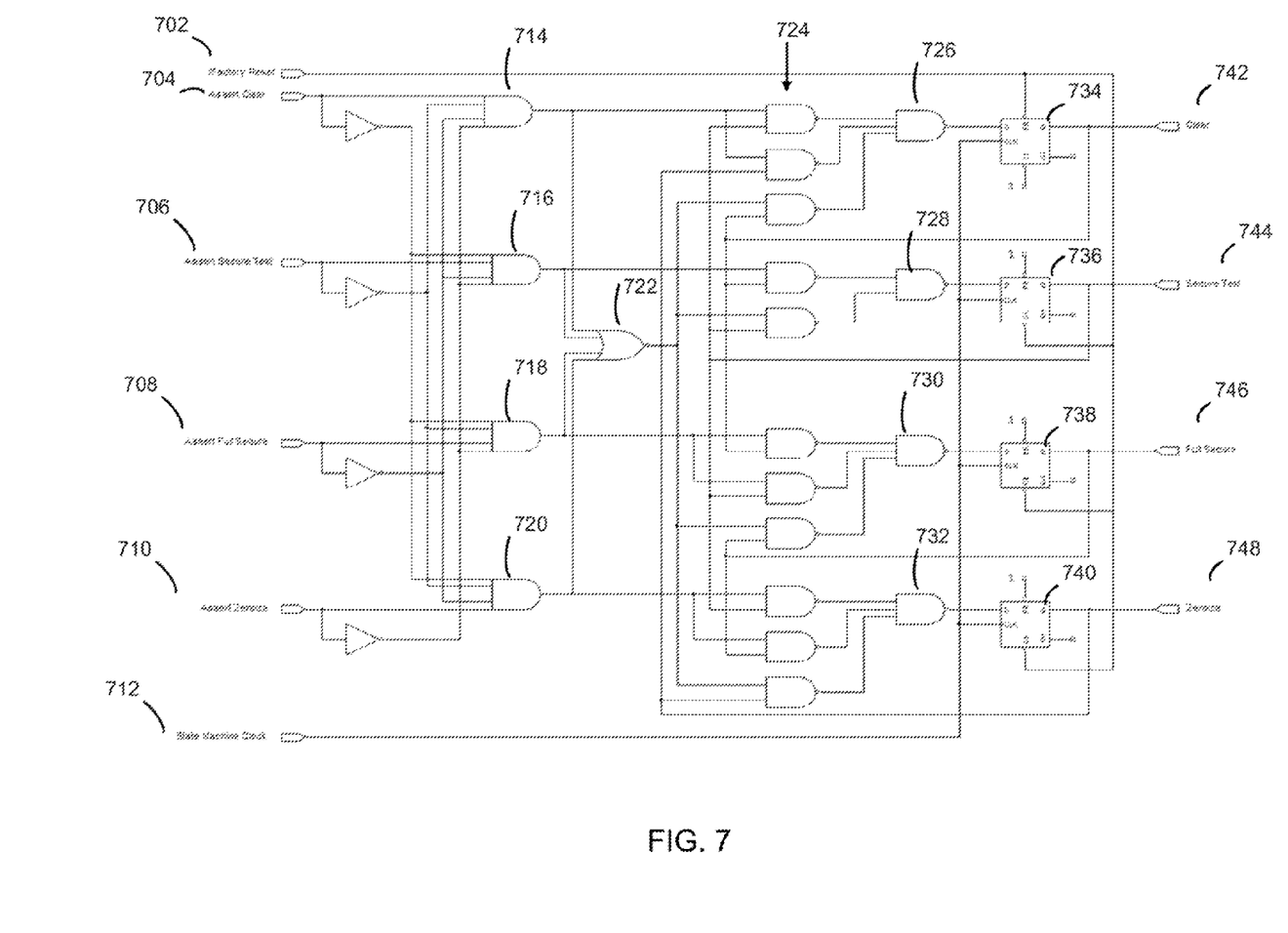
FIG. 7 is an example illustration of a logic diagram representing a state machine, according to an implementation.

FIG. 7 depicts an example logic diagram of logic to implement the state machine as depicted in FIG. 5. The components of the circuit may be powered non-volatilely such that, when power is cycled, state and security are maintained.

The states in the state machine may be changeable both by hardware and by software. This allows hardware signals to change the state, such as an attack forcing zeroization, and also allows software to change the state, such as a manufacturing organization performing initialization and placing the unit into secure state (from clear state).

The state machine may be capable of rejecting improper transitions. An example is transitioning from zeroize to secure state.

One bit may be provided for each state. In the example in FIG. 7, four states are provided, thus, the state variable has four bits: clear state: 0001, testing secure state: 0010, full secure state: 0100 and zeroize: 1000.

When hardware or software initiates change of state, the bit for the desired state is set to 1. If the transition is allowed, the state variable will change to the new value with only 1 bit set. If the transition is not allowed, the state variable will remain unchanged.

As shown in FIG. 7, a plurality of inputs is provided. Factory reset 702 (active LOW) may be used once, for example, in the factory, to initialize the state machine. Alternatively, inherent initialization may be utilized. Assert clear 704 asserts the clear state. Assert testing secure 706 asserts the testing secure state. Assert full secure 708 asserts the full secure state. Assert zeroize 710 assets the zeroize state. State machine dock 712 represents a transition that takes place whenever a value is written to the state machine. State Machine dock may be a continuous dock, a discontinuous clock, a memory read- or write-enable signal, or any other signal source where a low-to-high transition takes place for any state transition to be recognized by the state machine hardware.

The plurality of inputs, in combination with the state machine clock 712, may be utilized to change the value of the state machine. The plurality of inputs may be controlled by software, hardware, or both.

In one or more implementations, software may not be given the ability to cause a transition to zeroize state. For example, the assert zeroize signal may not be connected to the processor in such a way that software can write to it. In the cases where software and hardware are both allowed to change the state, simply OR-ing the hardware signal with the software signal prior to connecting to the input of the state machine may be sufficient.

Input signals assert clear 504, assert testing secure 706, assert full secure 708 and assert zeroize 710 are provided to respective inverters and to AND gates 714, 716, 718 and 720. AND gates 714, 716, 718 and 720 ensure that no improper inputs are provided to the circuit by ensuring that only one of the four input signals are asserted. If more than one input signal is asserted, or no input signal is asserted, then the NOR gate 722 outputs HIGH such that none of the asserted input signals are passed into the circuit.

Eleven NAND gates 724 correspond to the rules to be applied when transitioning from one state to another state. Each of the eleven NAND gates enables one of the transitions noted in the table below. NAND gates 724 receive requested (input) state via AND gates 714, 716, 718 and 720 and NOR gate 722. NAND gates 724 receive current state values from flip-flops 734, 736, 738 and 740, discussed below. NAND gates 724 enable transitions in accordance with the following rules in order to determine the new state the state machine will transition to.

The following table includes the requested input state, the current state, and the new state that the state machine transitions to.

| Requested (Input) State | | | | Current State | | | | New State | | | |
|---|---|---|---|---|---|---|---|---|---|---|---|
| Zi | Si | Ti | Ci | Z | S | T | C | Zn | Sn | Tn | Cn |
| 0 | 1 | 0 | 0 | 0 | 0 | 0 | 1 | 0 | 1 | 0 | 0 |
| 0 | 0 | 1 | 0 | 0 | 0 | 0 | 1 | 0 | 0 | 1 | 0 |
| All other values | | | | 0 | 0 | 0 | 1 | 0 | 0 | 0 | 1 |
| 1 | 0 | 0 | 0 | 0 | 1 | 0 | 0 | 1 | 0 | 0 | 0 |
| All other values | | | | 0 | 1 | 0 | 0 | 0 | 1 | 0 | 0 |
| 1 | 0 | 0 | 0 | 0 | 0 | 1 | 0 | 1 | 0 | 0 | 0 |
| 0 | 0 | 1 | 0 | 0 | 0 | 1 | 0 | 0 | 0 | 1 | 0 |
| 0 | 0 | 0 | 1 | 0 | 0 | 1 | 0 | 0 | 0 | 0 | 1 |
| All other values | | | | 0 | 0 | 1 | 0 | 0 | 0 | 1 | 0 |
| 0 | 0 | 0 | 1 | 1 | 0 | 0 | 0 | 0 | 0 | 0 | 1 |
| All other values | | | | 1 | 0 | 0 | 0 | 1 | 0 | 0 | 0 |

Outputs from NAND gates 724 are input to NAND gates 726, 728, 730 and 732 and input to flip-flops 734, 736, 738 and 740. Flip-flops 734, 736, 738 and 740 may correspond to clear state, testing secure state, full secure state, and zeroize state. Flip-flops 734, 736, 738 and 740 may be implemented as, for example, D-type flip-flops, implementing a state variable latch, that hold the state value.

Flip-flops 734, 736, 738 and 740 may output state value via clear output 742, testing secure output 744, full secure output 746 and zeroize output 748. Outputs represent raw state machine value and may be provided to the processor through a bus buffer or latch, or may be utilized to control other hardware functions.

What is claimed is:

1. An apparatus, comprising:
a processor that
enables a clear state, the clear state to enable a non-secure processing function and to disable a security function;
enables a secure state that comprises a temporary secure state and a non-volatile secure state, the secure state to enable a secure processing function;
enables a transition from the temporary secure state to the clear state, wherein the transition to the clear state from the temporary secure state is enabled based on a reset pulse; and
enables a transition from the non-volatile secure state to the clear state, wherein the transition to the clear state from the non-volatile secure state is enabled based on a power loss.

2. The apparatus of claim 1, the processor that:
enables a zeroize state, the zeroize state being a security disabled fault state; and
transitions from the zeroize state to the clear state.

3. The apparatus of claim 2, wherein the zeroize state enables at least one key in a memory coupled to the processor be erased.

4. The apparatus of claim 2, the processor that:
enables a transition (i) from the secure state to the zeroize state or (ii) from the clear state to the secure state.

5. The apparatus of claim 2, wherein the secure state further comprises a full secure state, the processor that:
enables a transition from the full secure state to the zeroize state, wherein the transition to the zeroize state from the full secure state is enabled based on a security violation.

6. A method comprising:
enabling a clear state in which a processor operates, the clear state to enable a non-secure processing function and to disable a security function;
enabling a secure state in which the processor operates, the secure state comprising a temporary secure state and a non-volatile secure state, the secure state to enable a secure processing function;
enabling a transition from the temporary secure state to the clear state, wherein the transition to the clear state from the temporary secure state is enabled based on a reset pulse; and
enabling a transition from the non-volatile secure state to the clear state, wherein the transition to the clear state from the non-volatile secure state is enabled based on a power loss.

7. The method of claim 6, wherein the secure state further comprises a full secure state.

8. The method of claim 7, further comprising:
enabling a transition from the clear state to the temporary secure state or the non-volatile secure state;
enabling a transition from the temporary secure state or the non-volatile secure state to the clear state; and
enabling a transition from the clear state to the full secure state.

9. The method of claim 7, further comprising:
enabling a zeroize state, the zeroize state being a security disabled fault state;
enabling a transition from the full secure state to the zeroize state.

10. The method of claim 7, further comprising:
enabling a transition from the temporary secure state or the non-volatile secure state to the full secure state.

11. The method of claim 7, further comprising:
enabling a transition from the clear state to the full secure state.

12. The method of claim 9, wherein the transition to the zeroize state from the full secure state is enabled based on a security violation.

13. An apparatus, comprising:
a processor comprising a state machine that:
  enables a clear state, the clear state to enable a non-secure processing function;
  enables a secure state comprising a temporary secure state and a non-volatile secure state, the secure state to enable a secure processing function, wherein:
  a transition from the temporary secure state to the clear state is enabled based on a reset pulse, and
  a transition from the non-volatile secure state to the clear state is enabled based on a power loss.

14. The apparatus of claim 13, the state machine that:
disables a transition from the clear state to the secure state; and
enables the disabled transition from the clear state to the secure state.

15. The apparatus of claim 13, wherein the secure state further comprises a full secure state that is transitioned to a zeroize state based on a security violation.

* * * * *